United States Patent [19]

Pascucci et al.

[11] Patent Number: 5,085,894

[45] Date of Patent: Feb. 4, 1992

[54] METHOD OF BONDING SILICONE ELASTOMER TO A SUBSTRATE

[75] Inventors: Carlo Pascucci, Brussels; Andreas T. F. Wolf, Nivelles, both of Belgium

[73] Assignee: Dow Corning S.A., Valbonne, France

[21] Appl. No.: 645,930

[22] Filed: Jan. 25, 1991

[30] Foreign Application Priority Data

Feb. 7, 1990 [GB] United Kingdom ................ 9002716

[51] Int. Cl.⁵ ............................................. B05D 3/02
[52] U.S. Cl. ................................ 427/387; 427/407.1; 427/409; 427/412.1; 428/447; 428/448; 428/450; 428/451
[58] Field of Search .............. 427/302, 387, 407.1, 427/409, 412.1; 156/329; 428/447, 448, 450, 451

[56] References Cited

U.S. PATENT DOCUMENTS 4,517,238  5/1985  Mine et al. ........................... 427/302
4,529,749  7/1985  Favre et al. ......................... 524/201

*Primary Examiner*—Michael Lusignan
*Attorney, Agent, or Firm*—Roger H. Burrousch; Edward C. Elliott

[57] ABSTRACT

A method of bonding a silicone elastomer to a substrate which comprises treating the surface of the substrate with a cleaning agent which is a polydiorganosiloxane, for example a polydimethylsiloxane, and thereafter applying to the treated surface a room temperture curing silicone elastomer-forming composition.

The method finds particular application in the construction industry for the bonding of sealants to non-porous substrates such as aluminum.

7 Claims, No Drawings

METHOD OF BONDING SILICONE ELASTOMER TO A SUBSTRATE

This invention relates to a method of forming a substrate having a silicone elastomer bonded thereto.

Silicone elastomer-forming compositions are well-known and widely employed in numerous industries. One particular type of such compositions (generally referred to as room temperature vulcanisable or RTV's) have the ability to cure to an elastomer at normal ambient or slightly elevated temperatures either spontaneously on mixing the components or as a result of exposure to atmospheric moisture. This property renders them particularly suitable for use as, for example, sealants and coating materials. Although they perform satisfactorily in most such applications they sometimes suffer from a lack of consistency in their adhesion to the various substrates to which they are applied. The technical literature is replete with patent specifications and other publications relating to primer compositions which are useful for improving the adhesion of silicone elastomer compositions to substrates. As examples of such literature there may be cited U.K. Patent Specifications Nos. 1 255 138, 1 332 840, 1 493 517 and 1 523 072. However, their use is not always satisfactory or convenient because, for example, they require a prolonged drying or curing time or they have associated handling problems due to the presence of organic solvents or other noxious substances. Thus, for example, U.K. Patent 1 255 138 discloses a primer composition which is a polycondensate containing predominantly siloxane units having alkoxy groups bonded to silicon atoms. Said polycondensates are not only employed as solutions in alcohols or polar solvents but need to be crosslinked by exposure to water prior to application of the elastomer.

The problem of obtaining good consistent adhesion of RTV silicones is of particular relevance in the construction industry where such silicones are now widely employed as sealing materials. In connection with this application the sealant is required to have good consistent adhesion to substrates such as metals, glass and masonry. Satisfactory adhesion is especially important in order to attain the maximum service life when the sealant is used in structural glazing, curtain wall sealing or insulating glazing applications. In order to achieve the desired adhesion in construction and other applications it is the practice, prior to application of the sealant, to pretreat the substrates in order to remove grease, dirt and grime and condition the surface for receiving the primer or the sealant. The substances used in the pretreatment step are usually organic solvents, or mixtures thereof, which may or may not contain other substances such as agents for rendering the solvent alkaline. As mentioned above such solvents are often noxious and flammable thus requiring special handling and storage. Their use is also undesirable from an environmental standpoint. In addition, although organic solvents are effective degreasing and cleaning materials their use does not of itself lead to reliable adhesion in the sense of providing satisfactory adhesion consistently on various surfaces, and retaining that adhesion during long term weathering. This is particularly true when the substrate surface is anodised aluminium where the anodising process results in variable and unreproducible substrate conditions. Samples of aluminium from the same anodised batch may vary considerably with regard to the adhesion attainable between their surfaces and RTV silicones.

There has thus existed a need for a method of bonding silicone elastomers to substrates which avoids or minimises the use of noxious or otherwise undesirable substances, but which results in satisfactory and more consistent adhesion between the silicone elastomer and the substrate. We have now found that such a method results if there is employed as the cleaning/conditioning agent certain liquid polydiorganosiloxanes.

It is known from European patent application No. 182 583, published 5-28-1986, also U.S. Pat. No. 4,685,930, issued 8-11-1987, that certain volatile siloxanes can be employed to remove spots and stains from textile fabrics. It is also known from G.B. 2 057 485A also U.S. Pat. No. 4,324,595, issued 4-13-1982, that cyclic siloxanes can be used to remove tacky adhesives from a substrate such as human skin. However, there is no disclosure, or any suggestion, in said publications of the use of said siloxanes in a method for bonding room temperature vulcanising (RTV) silicone compositions to metal and other substrates found in the construction industry.

According to the present invention there is provided a method for bonding a silicone elastomer to a substrate which comprises treating a substrate by contacting a surface of said substrate with treating agent consisting of a liquid polydiorganosiloxane wherein the organo radicals attached to the silicon atoms are monovalent groups having up to 18 carbon atoms selected from the group consisting of hydrocarbon groups and halogenated hydrocarbon groups, and thereafter applying to the treated surface a room temperature vulcanisable silicone elastomer-forming composition.

The polydiorganosiloxanes which are employed as the treating agents in the method of this invention are those which are liquid at normal ambient temperatures (25° C.). They may be linear or cyclic in structure and, depending on their molecular configuration and chain length, may have from about two organic groups per silicon for the non organo end-stopped linear and the cyclic siloxanes, up to three such substituents as in the case of the hexaorganodisiloxanes. The linear liquid polydiorganosiloxanes are preferably end-stopped with triorganosiloxy units, for example trimethylsiloxy, trimethylvinylsiloxy, methylphenylvinylsiloxy or phenyldimethylsiloxy units: but may be terminated with other, for example silicon-bonded hydroxyl, groups. Preferred as the liquid polydiorganosiloxanes for use in this invention are the low molecular weight materials having a viscosity of less than $10^{-4}$ m$^2$/s at 25° C., most preferably of less than $20 \times 10^{-6}$ m$^2$/s at 25° C.

The organic substituents present in the liquid polydiorganosiloxanes are selected from monovalent hydrocarbon groups and monovalent halogenated hydrocarbon groups having up to 18 carbon atoms. Examples of such organic substituents are alkyl groups such as methyl, ethyl, propyl, tetradecyl and octadecyl, alkenyl groups such as vinyl, allyl and hexenyl, aryl groups such as phenyl and naphthyl and halogenated alkyl such as trifluoropropyl. From a cost aspect the preferred polydiorganosiloxanes are those wherein at least 50 percent of the total substituents are methyl groups. Such preferred polydiorganosiloxanes include trimethylsiloxy end-stopped polydimethylsiloxanes and cyclic methylsiloxanes, for example hexamethyldisiloxane, octamethyltrisiloxane, hexamethylcyclotrisiloxane, octamethylcyclotetrasiloxane, decamethylcyclopentasiloxane, dodecamethylcyclohexasiloxane and siloxanes represented by the formula $R_3SiO(R_2SiO)_nSiR_3$ in which R represents the methyl group and n has a value from 1 to about 16. The polydiorganosiloxanes may be employed as the individual compounds or as mixtures of two or more. Thus, while hexamethylcyclotrisiloxane is a solid at normal ambient temperatures it may be used in admixture with a polydiorganosiloxane, for example the methylcyclopentasiloxane, which is a liquid at the working temperature.

Treatment of the substrate with the liquid polydiorganosiloxane may be achieved using any suitable application technique, for example by brushing, spraying, immersion or by rubbing with a cloth soaked in the polydiorganosiloxane. In cases where the substrate has visible dirt and grime thereon it is preferred to apply the polydiorganosiloxane with an abrasive or rubbing action to ensure proper cleaning in addition to the conditioning effect. If desired the polydiorganosiloxane may be diluted with organic solvent or other volatile liquid cleaning aid, although the presence of such additional components is not believed to confer any significant additional benefit and may lead to inferior results when compared with the use of the polydiorganosiloxane alone. The polydiorganosiloxane may be dried or allowed to dry on the treated substrate prior to the application of the silicone elastomer-forming composition. However, in contrast to the prior methods employing organic solvents it is not necessary to wait until the substrate has dried before applying the elastomer-forming composition. If desired, the application of the elastomer-forming composition may be delayed. Experiments have indicated that the conditioning effect imparted by the polydiorganosiloxane treatment is of longer duration than that using prior art solvent treatments, thus providing a greater margin of time in which to apply the elastomer-forming composition.

The room temperature vulcanisable compositions which are applied to the treated substrate in accordance with the method of this invention can be any silicone composition which is capable of conversion to an elastomer at or about normal ambient temperatures, normally 20®-25° C. Conversion may occur on mixing the separately packaged active ingredients (so-called two component type) or may require exposure to moisture (one component type). Compositions of the RTV-type generally comprise an organosiloxane polymer having reactive terminal groups, e.g. hydroxyl or alkoxyl, together with a crosslinking agent for the polymer. They may or may not contain a crosslinking catalyst e.g. an organic compound of tin or titanium. A variety of such elastomer-forming compositions are known in the art and are commercially available. Examples of such elastomer-forming compositions for use in the method of this invention are
  (A) vulcanisable organosiloxane compositions based on an organosiloxane polymer having in the molecule silicon-bonded oxime radicals, and/or a mixture of an organosiloxane polymer having silanol groups and a silane having at least 3 silicon-bonded oxime groups. Such compositions are described for example, in U.K. Patents 975 603 and 990 107;
  (B) vulcanisable organosiloxane compositions based on an organosiloxane polymer having terminal silicon-bonded acyloxy groups, and/or a mixture of a silanol-terminated organosiloxane polymer and a silane having at least 3 silicon-bonded acyloxy groups per molecule. Such compositions are described for example in U.K. Patents 862 576, 894 758 and 920 036:
  (C) vulcanisable compositions based on an organosiloxane polymer having terminal silicon-bonded amide or amino groups, and/or a mixture of silanol-terminated organosiloxane polymer and a silylamine or silylamide. Such vulcanisable compositions are described, for example, in U.K. Patents 1 078 214 and 1 175 794.
  (D) vulcanisable organosiloxane compositions based on an organosiloxane polymer having in the molecule silicon-bonded alkoxy groups and/or a mixture of an organosiloxane polymer having silanol groups with a silane having alkoxy groups or a partial hydrolysis product of said silane, for example, ethyl polysilicate. Compositions of this type are described in U.K. Patents 957 255, 962 061 and 841 825.

Although the elastomer-forming composition may utilise any room temperature curing reaction the method of this invention is particularly adapted to the bonding of the so-called two component RTV's, which normally exhibit poor adhesion to many substrates. The preferred elastomer-forming compositions are therefore those of the type described under (D) above and comprise a mixture of a polydiorganosiloxane having terminal silanol ($\equiv$SiOH) groups, an alkoxy silane or siloxane as crosslinking agent, for example methyltrimethoxysilane, ethylpolysilicate or n-propylpolysilicate and a metal salt of a carboxylic acid, for example stannous octoate, dibutyltin dilaurate or dioctyltin dilaurate. As is well known such compositions are normally prepared and stored as two packages, the packages being mixed at the point of use. The proportions in which the components of such compositions are employed are well-known in the art. For example the crosslinking agent and metal salt catalyst will normally be employed in proportions of from 0.2 to 20 and 0.05 to 5 parts by weight respectively per 100 parts by weight of silanol-terminated polydiorganosiloxane.

If desired the elastomer-forming composition may contain, in addition to fillers (for example silicas, clays and calcium carbonate) and other conventional ingredients, additives for improving the adhesion of the cured elastomer to the substrate. Known additives include silanes having silicon-bonded reactive groups, such as aminoalkylalkoxy silanes and epoxyalkylalkoxy-silanes.

The method of this invention can be employed to bond RTV silicone compositions to a variety of substrates. It is particularly adapted for use on non-porous substrates normally found in the construction industry, for example metal, coated metal, glass and coated glass, ceramics, glazed tiles and plastics, for example polyesters.

The following Examples, in which the parts are expressed by weight, illustrate the invention.

EXAMPLE 1

In this Example the elastomer-forming composition employed was of the two-component type and was obtained by mixing together a silanol-terminated polydimethylsiloxane having a viscosity of approximately 12,500 mPa.s (49.3 parts), treated calcium carbonate as filler (49.7 parts), n-propyl orthosilicate crosslinking agent (2.0 parts), dibutyltin dilaurate catalyst (0.07 parts), aminopropyltriethoxysilane (1.7 parts) as adhesion improving additive and a small proportion of a trimethylsilyl end-stopped polydimethylsiloxane as plasticiser.

A comparison between the prior art bonding methods and the method of this invention was carried out employing rigid anodised aluminium strips of various colours and anodisation types as the substrates. Each group of 5 strips was cleaned with a specific cleaning/conditioning liquid which was one of the following:
alkaline isopropyl alcohol (IA),
a mixture of isopropyl alcohol and acetone (IAA),
trichloroethane (CHL),
methylisobutylketone (MIBK),
hexamethyldisiloxane (Siloxane A),
octamethyltrisiloxane (Siloxane B), a trimethylsilyl end-stopped dimethylsiloxane oligomer (viscosity 5 m.PaS at 25° C.) (Siloxane (C),
octamethylcyclotetrasiloxane (Siloxane D) and
dodecamethylcyclopentasiloxane (Siloxane E).
One group of strips was subjected to a two step cleaning process, first with trichloroethane and then with methylisobutylketone (CHL+MIBK).

The cleaning procedure consisted of wiping the working (elastomer-contacting) surfaces several times with absorbent paper soaked in the cleaning liquid and allowing the cleaned substrate to dry at the laboratory ambient temperature.

The elastomer-forming composition was then applied without delay to each of the cleaned, dry surfaces in sufficient quantity to provide a thick bead thereon. A 1 cm wide aluminium mesh strip was then pressed into the sealant leaving the tip of the mesh exposed. A further layer of the composition was applied over the strip and the composition pressed with a smooth metal tool to ensure good contact between sealant and substrate. The applied composition was allowed to cure at normal ambient temperature (about 22° C.) for seven days and the test specimens then divided into 3 groups: one group was immersed in demineralised water for 1 week at room temperature, the second and third groups were immersed in demineralised water at 55° C. for 1 week and 2 weeks respectively. The adhesion between the elastomer and the substrate was then measured by a modified ASTM L-794-80 test whereby the elastomer is gripped via the exposed tip of the mesh and is peeled back at 180° angle from the aluminium substrate using a Zick 1445 dynamometer.

The results of the tests were assessed by ascribing a positive result in each case where bond failure was cohesive and occurred at a reading of greater than 3.0 kN/mm. The positive results were then expressed as a percentage of the total tests in each group and the values are set out in the following Table.

| Substrate | Cleaning Liquid | Positive Results (%) |
| --- | --- | --- |
| Anodised Aluminium | CHL + MIBK | 76.10 |
| Anodised Aluminium | IAA | 56.66 |
| Anodised Aluminium | IA | 58.33 |
| Anodised Aluminium | MIBK | 66.66 |
| Anodised Aluminium | CHL | 33.33 |
| Anodised Aluminium | Siloxane A | 70.03 |
| Anodised Aluminium | Siloxane B | 66.66 |
| Anodised Aluminium | Siloxane C | 73.33 |
| Anodised Aluminium | Siloxane D | 55.55 |
| Anodised Aluminium | Siloxane E | 66.66 |

The results indicate that except in the case of the two step treatment CHL and MIBK the siloxane cleaning liquids gave peel strength values at least as good as those obtained with the organic solvents.

EXAMPLE 2

The procedure described in Example 1 was repeated except that the test substrates were polyester-coated aluminium. The choice of comparative organic solvents was limited in this case because of the possibility of swelling or discolouration of the polyester coating. The following results were obtained.

| Substrate | Cleaning Liquid | Positive Results (%) |
| --- | --- | --- |
| Polyester-coated Aluminium | isopropyl alcohol | 33.33 |
| Polyester-coated Aluminium | IAA | 66.66 |
| Polyester-coated Aluminium | Siloxane A | 66.66 |

EXAMPLE 3

The procedure of Example 1 was repeated employing respectively MIBK, IAA, IA and Siloxane B as cleaning liquids for the anodised aluminium test pieces. Prior to application of the elastomer-forming composition the cleaned test pieces were stored under dry laboratory conditions for 24 hours. Upon termination of the 7 day curing period, peel strength measurements were carried out on the test pieces (no water immersion) using the Zick dynamometer. The results obtained are shown in the following table which also includes for comparison values obtained on test pieces where the elastomer-forming composition was applied immediately to the dried aluminium surface.

| | Peel Strength (MPa) | |
| --- | --- | --- |
| Cleaning Liquid | Immediate Application | After 24 Hours |
| MIBK | 0.2 | 0.13 |
| IA | 0.24 | 0.23 |
| IAA | 0.25 | 0.12 |
| Siloxane B | 0.25 | 0.25 |

It will be seen from the above that the surface cleaned with the siloxane retains its good adhesive properties even if application of the elastomer-forming composition is delayed for 24 hours. Surfaces cleaned with the organic solvents tend to have lower adhesion if the application of the elastomer-forming compositions is delayed.

EXAMPLE 4

The surfaces of anodised aluminium strips were wiped several times with absorbent paper soaked in a liquid polydiorganosiloxane of the formula $HO[CF_3CH_2CH_2(CH_3)SiO]_nH$ in which n had an average value of about 5. A bead of an elastomer-forming composition as described in Example 1 was then applied to each of the treated surfaces in the manner set out in that Example and allowed to cure to an elastomer for 7 days. Adhesion between the elastomer and substrate was then assessed by pulling the elastomer at one end. In 60% of the test pieces failure occurred cohesively, that is by tearing of the elastomer.

For comparison similar tests were performed on similar aluminium strips which had been cleaned with acetone, methylethyl ketone or isopropyl alcohol. In each case little adhesion was observed between elastomer and substrate and failure occurred adhesively at the interface.

EXAMPLE 5

The surfaces of three sets of anodised aluminium panels were cleaned by wiping several times with absorbent paper soaked in hexamethyldisiloxane. Employing the technique described in Example 1 peel test samples were prepared by applying elastomer-forming compositions to the treated surfaces and thereafter allowing the compositions to cure to elastomers for 7 days at room temperature (22° C.). The elastomer-forming composition (X) applied to the first set of panels was of the type described in (D) hereinabove and comprised a mixture of a silanol-terminated polydimethylsiloxane, methyltrimethoxysilane and a titanium chelate. To the second set of panels was applied a composition (Y) of the type referred to in (A) above and comprising a silanol-terminated polydimethylsiloxane and an oxime silane. To the remaining set of panels was applied a composition (Z) of type (B) hereinabove comprising a silanol-terminated polydimethylsiloxane and an acetoxy silane.

The panels were immersed in water at 55° C. and peel strength tests carried out as described in Example 1 after 1, 2, 3 and 4 weeks immersion. Comparison tests were also carried out on aluminium test panels prepared as described above except that the cleaning step employing hexamethyldisiloxane was omitted. The test results were as follows, the first figure in each column relating to the treated substrate and the second to the untreated substrate.

| Composition | Peel Strength (KN/mm) | | | |
|---|---|---|---|---|
| | 1 Week | 2 Weeks | 3 Weeks | 4 Weeks |
| X | 2.1/2.0 | 1.8/1.6 | 1.5/1.1 | 1.1/0.3 |
| Y | 2.5/2.2 | 2.0/1.2 | 1.2/0.6 | 0.2/0 |
| Z | 1.2/0.8 | 1.0/0.3 | 0.6/0 | 0/0 |

That which is claimed is:

1. A method for bonding a silicone elastomer to a substrate which comprises treating a substrate by contacting a surface of said substrate with treating agent consisting of a liquid polydiorganosiloxane wherein the organo radicals attached to silicon are monovalent groups having up to 18 carbon atoms selected from the group consisting of hydrocarbon groups and halogenated hydrocarbon groups, and thereafter applying to the treated surface a room temperature vulcanisable silicone elastomer-forming composition.

2. A method as claimed in claim 1 wherein at least 50 percent of the total organic substituents in the liquid polydiorganosiloxane are methyl.

3. A method as claimed in claim 2 wherein the liquid polydiorganosiloxane is selected from the group consisting of trimethylsiloxy end-stopped polydimethylsiloxanes and cyclic methylsiloxanes.

4. A method as claimed in claim 1 wherein the liquid polydiorganosiloxane has a viscosity of less than $20 \times 10^{-6}$ m$^2$/s at 25° C.

5. A method as claimed in claim 1 wherein the substrate is metal, glass or plastic.

6. A method as claimed in claim 1 wherein the room temperature vulcanisable silicone elastomer-forming composition is of the type comprising a mixture of a polydiorganosiloxane having terminal silanol groups, a crosslinking agent selected from silanes having at least three alkoxy groups and partial hydrolysis products of said silanes and a catalyst.

7. A substrate having a silicone elastomer bonded thereto whenever obtained by the method of claim 1.

* * * * *